United States Patent Office 2,724,567
Patented Nov. 22, 1955

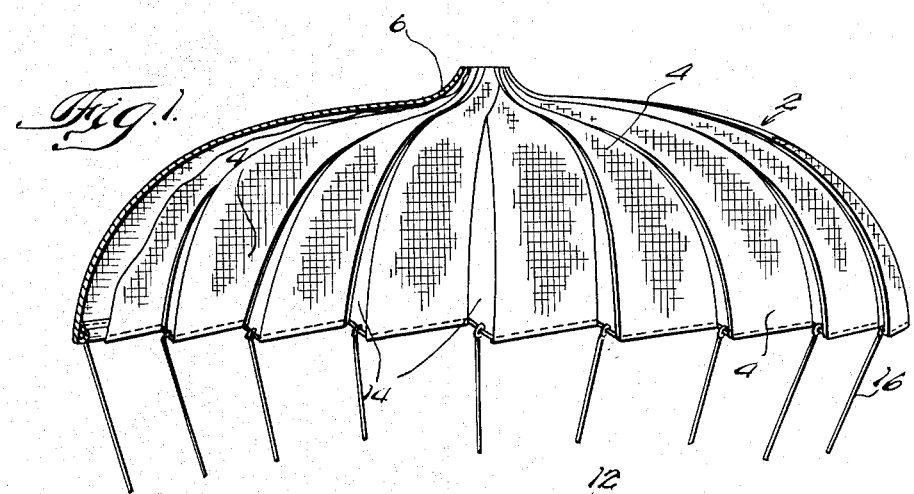
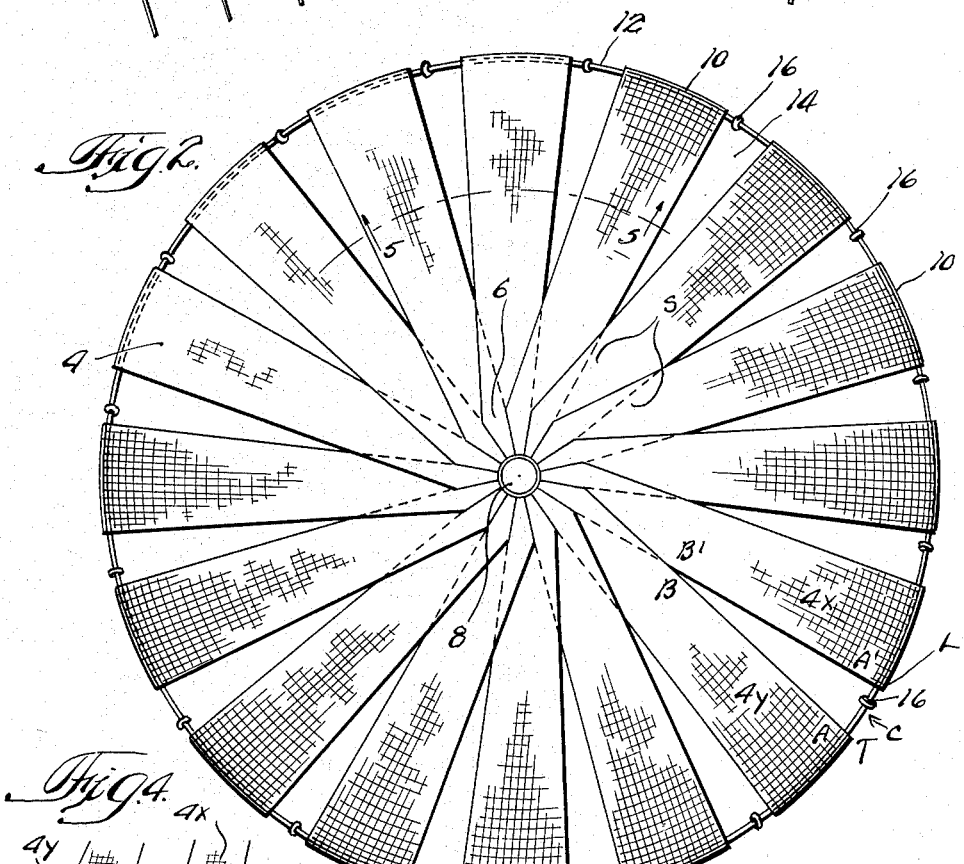

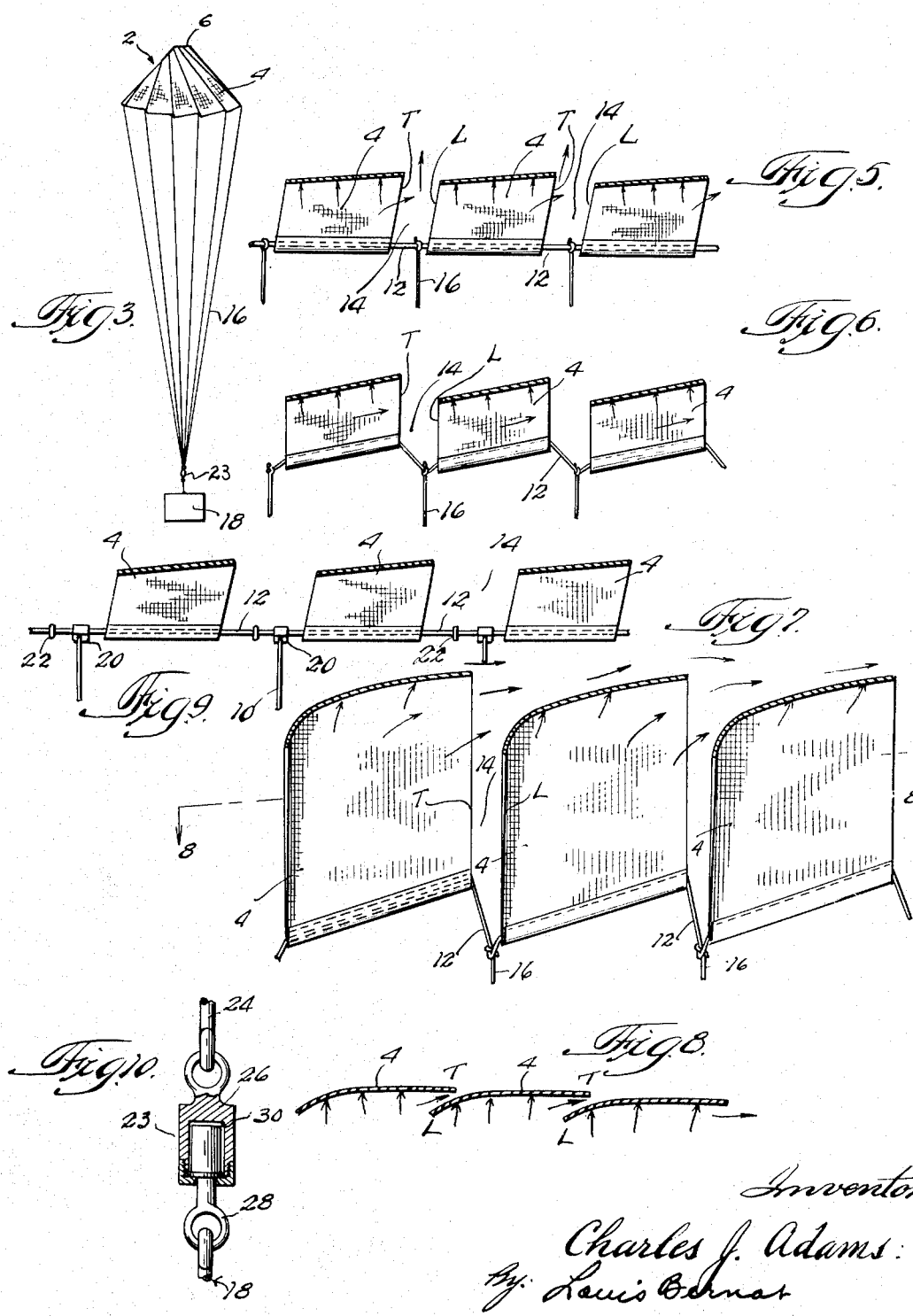

2,724,567

MULTI-AIRFOIL PARACHUTE

Charles J. Adams, Chicago, Ill., assignor to Land-Air, Inc., Chicago, Ill., a corporation of Illinois Application February 24, 1953, Serial No. 338,442

11 Claims. (Cl. 244—145)

The present invention relates to parachute construction particularly adapted for operation in conjunction with high-speed aircraft. A parachute constructed in accordance with the present invention further produces a large decelerating force due to the rotational effect produced by the use of airfoils in the construction of the parachute.

In order to comprehend the use of a multi-airfoil slotted parachute which utilizes the aerodynamic lift forces instead of the drag forces to improve the performance of the chute, consider a disc rotating about a geometric center that has a maximum velocity at its periphery and zero velocity at its center of rotation. If a series of airfoils were arranged with all the leading edges of these foils in a clock-wise direction and each one of the leading edges terminating at a mid-rotating point, the result would produce the same effect as an infinite series of airfoils at any radial distance. This arrangement would describe the trailing edge of each of the airfoils to the leading edge of the following airfoil in order to produce a slot effect, thereby increasing the lift and the aerodynamic efficiency.

In accordance with the present invention the multi-airfoil effect is enhanced by the provision of angular rotation of the canopy of the parachute with respect to the attached load. This effect is achieved by varying the angle of attack of the respective airfoil panels to a lesser point where the movement of the respective airfoils is independent of the angle of attack. This lesser point is just below the stall point; because any increase in the angle of attack would produce a negative effect.

It is, therefore, the principal object of this invention to provide a parachute construction of multi-airfoil panels whereby in the development of the parachute the aerodynamic lift faces are utilized instead of the drag forces to improve performance.

It is a further object of the invention to provide, in a parachute of the class described, canopy lift angular rotation with respect to the load in order to reduce the opening shock, to lower the sinking velocity for an equivalent load, to increase the load weight for equivalent sinking velocities, to increase stability and upon touching the ground to cause the parachute to collapse, thus reducing the after drag to a minimum.

Further advantages of construction and operation will be pointed out in connection with the description of the drawings illustrating several embodiments of the invention. In these drawings, Figure 1 is a side view of a parachute in accordance with this invention partly shown in section wherein the rigging lines are partly broken away from the canopy;

Figure 2 is a plan view of the canopy;

Figure 3 is a diagrammatic view of a deployed parachute indicating the warped structure of the canopy illustrating the rigging lines attached to the load;

Figure 4 is a diagrammatic view illustrating the relative positions of the rigging lines with respect to the trailing and lead edges of the airfoil panels during deployment of the parachute;

Figure 5 is a perspective view partly in section of Figure 2, showing warped airfoil panels and rigging lines after partial deployment of the parachute;

Figure 6 is a perspective view partly in section showing the weighted airfoil panels and rigging lines after deployment of the parachute;

Figure 7 is a diagrammatic view in perspective illustrating the motion of air through the slot vents during the descent of the parachute;

Figure 8 is a cross-section view taken along line 8—8 of Figure 7 illustrating the overlapping of the airfoil panels;

Figure 9 is a perspective view partly in section illustrating the movable rigging lines attached to the auxiliary members which are attached to the airfoil panels; and Figure 10 is a side view partly in cross-section of the swivel positioned intermediately between the rigging and the load.

Referring now to these drawings, in which similar reference characters indicate similar parts, the canopy indicated generally at 2 comprises a plurality of airfoil panels 4, which are arranged in a manner illustrated in Figures 1 and 2. These airfoil panels 4 may terminate at the crown area or apex 6 of the canopy 2 and are fastened by taping, cording, sewing or other attaching methods conventionally used in parachute construction.

Centrally located in the apex 6, a jet vent 8 is preferably positioned to create a jet stream within the parachute so as to avoid filling of the parachute and thereby achieving a non-stalling condition. Although in the efficient operation of the parachute, this particular structure may be considered as optional depending on the size and load factor of the parachute. The jet vent 8 may be defined as a plurality of openings positioned centrally within the canopy 2; although a singular jet vent 8 is preferred.

The airfoil panels 4 radiate outwardly from the apex 6, and the peripheral ends 10 are seamed or hemmed wherein auxiliary members 12 are defined as the interlacing or interlinking structures between the respective airfoil panels 4. It shall be noted that slotted vents 14 may be considered as open areas or slots between the respective airfoil panels 4. Attached to the auxiliary members 12 are the respective rigging lines 16, which terminate and are secured to the load 18.

Figure 3 is illustrative of the initial opening of a parachute structure wherein the airfoil panels 4 are warped upon deployment of the parachute.

In the construction of the parachute, the canopy fabric for the airfoil panels 4 may consist of the following materials: linen, silk, cotton, jute hessian, paper, cellulose-acetate fabric, viscose rayon fabric, cuprammonium rayon fabric, nylon, and other synthetic fibers. These airfoil panels 4 are taped or corded in the apex 6 and sewn at their edges in order to form the crown area.

The auxiliary members 12 may be constructed of cord, ribbon or metallic cable, and are attached to the respective panels 4. The rigging lines 16 may be constructed of corded or cabled material conventionally used as rigging lines or shroud lines.

The airfoil panels 4 may be arranged in a symmetrical structure as illustrated in Figures 1 and 2, wherein the panels may overlap the adjacent panels illustrated by the dotted line S. Although Figures 1 and 2 illustrate a symmetrical configuration wherein the slot vents 14 define an open area between each of the successive airfoil panels 4, it has been found that a non-symmetrical arrangement of the airfoil panels may be used and that the slot vents 14 may be varied in symmetry. In addition, the slot vents between the respective airfoil panels 4 may also vary in area.

In describing the operation of the parachute, constituting the subject matter of this invention, consider the airfoil panels $4x$ and $4y$ in Figures 2 and 4. The slot effect is greatest at some point between AB and A'B', which defines the maximum aerodynamic lift in from the peripheral edge 10 along the point A or A'. The initial angle of attack, which is controlled by the position of the control point C with respect to the leading edge L of the airfoil panel 4x and the trailing edge T of the respective airfoil panel 4y, is defined as the point of attachment of the rigging line 16 to the auxiliary member 12.

By constructing an imaginary reference axis line from the point BB' and intersecting the chord described by the auxiliary member 12, this point would illustrate the maximum angle of attack that may be achieved in the deployment of the parachute; because if the angle of attack is increased, a negative result would be obtained providing a stall. At this point the coefficient of lift tends to move toward zero and the center of pressure to infinity within the canopy of the parachute, thus providing a static aerodynamic center. By moving the control point C in the direction of the leading edge, a clock-wise rotation is produced upon deployment of the parachute. It shall also be noted that warpage of the airfoil panels 4x and 4y will be in the direction of the leading edge L from the normal axis of the canopy 2 which extends through the apex 6.

In the initial stages of deployment, it shall be noted in Figure 5 that the airfoil panels 4 are warped in the direction of the leading edge L, which is displaced from the normal. It shall be further noted that in the next stage of deployment weighting occurs due to the effect of the load, and Figures 6, 7 and 8 illustrate the relative position of the airfoil panels 4 and the overlapping of the trailing edge T over the leading edge L thereby producing the airfoil slot effect which will create an angular rotation of the canopy in a clock-wise direction and the desired aerodynamic lift. The arrows in these illustrations indicate the direction of the movement of air, as well as the direction of spilling out.

The anti-effect to the aerodynamic lift produced by the slot effect may be described as the braking action or parasite drag, shown by the relative position of the rigging line 16D in Figure 4, which creates a counter-clockwise rotation of the canopy, thereby tending to reduce aerodynamic lift. An additional factor which will create a counter-clockwise rotation is due to the trapping of the air within the chute, which may tend to increase the angle of attack so that the chute will tend to proceed into an aerodynamic stall. Accordingly, it has been found in the present invention that the effect of the aerodynamic lift is greater than is the anti-effect of the parasite drag, the skin effect and trapping of the air in the vertical descent, so that a relatively high angular velocity in the clockwise direction is obtained.

If in the event the position of the rigging line 16 is positioned beyond the control point C in the direction of the trailing edge, the parachute will thereby achieve a counter-clockwise rotation. The anti-effects as noted above will be in the opposite direction of the aerodynamic lift, whereby resultant angular rotation will be in the counter-clockwise direction.

The optimum position of the point C will be determined by the amount of lift created by the velocity of rotation, since the velocity of rotation is primarily controlled by the point C.

It was further noted in testing the device, that a "scooping effect" was introduced by the outer edge 10 providing a build up of the air within the parachute, and that a spilling out of the air was created in the internal portion of the canopy 2, through the slot vents 14 and the jet vent 8.

For the purpose of illustration, the airfoil panels 4 in Figure 2 are straight in detail in the left side of the canopy 2, when actually upon deployment, the panels 4 will, if no means for maintaining rigidity is provided, cup thereby attaining an umbrella-like canopy shape.

Figure 9 is another embodiment of this invention illustrating a movable adaptor 20 which may be slideably attached to the auxiliary member 12 and having a clamp stop 22 positioned at a point intermediate between the leading edge L and the control point C of any one of the slot vents 14. A symmetrical or asymmetrical arrangement may be used in the construction of the canopy, and this slidable arrangement will tend to automatically vary the slot effect upon the deployment of the parachute. It is highly desirable to gradually control the maximum area of the slot vent 14; and by allowing the rigging line 16 to move from the leading edge L to the clamp stop 22, a gradual variation in the rate of vertical descent may be noted.

Figure 10 is illustrative of a swivel 23 which consists of an eye 24 attached to the rigging line 16 at a terminal point. The eyelet 24 is attached to the upper portion 26 of the swivel 23, and the lower portion 28 of the swivel 23 is so positioned that it will rotate freely within the cavity 30 of the swivel 23. The load 18 is attached to the lower portion 28 of the swivel 23. This swivel 23 is designed primarily to reduce the amount of free rotation of the load in comparison to the rotation of the canopy 2.

In the development of a parachute of the present invention the initial opening shock is substantially reduced and the sinking velocity for an equivalent load is considerably lower than those of conventional designs, due to the aerodynamic lift which is achieved by the angular rotation of the canopy produced by the aerodynamic slot effect.

In addition, it shall be noted that greater loads may be handled as compared to parachutes of the conventional design for comparative sinking velocities. Furthermore, the multiple airfoil parachute of the present invention tends to reduce the oscillatory motion, and it has been found that the angle displacement is reduced to 1 to 3° from the vertical normal descent.

Furthermore, upon touching the ground it has been noted that the multiple airfoil parachute tends to collapse almost immediately, thus restricting the amount of drag on the load.

While the invention has been described in some detail, it should be understood that the invention shall not be limited to the details herein described and may be carried out in other ways.

It shall be noted that an additional modification of the invention may entail a continuing appendage at the peripheral end 10 of the airfoil panel 4, whereby a gore structure simulating the vent slot 14 may be obtained. The rigging lines 16 may be attached to this appendage thereby theoretically eliminating the auxiliary members 12; although the modified structure is substantially similar in operation to the structures illustrated in the drawings. Substantially, the continuing appendages are the same as the auxiliary members 12.

I claim as my invention:

1. A parachute comprising a canopy composed of a plurality of airfoil panels terminating at the apex of said canopy and radiating outwardly therefrom, certain of said airfoil panels defining a leading and a trailing edge spaced superimposed over adjacent airfoil panels separated by slot vents therebetween, rigging means attached to the peripheral edges of certain of said airfoil panels connecting the canopy to a load, and upon deployment of the parachute certain of said airfoil panels warped in a predetermined manner defining an angle of attack necessary to produce angular rotation of the canopy.

2. A parachute comprising a canopy composed of a plurality of airfoil panels, said panels terminating at the apex of said canopy, each of said panels successively over-lapping the adjacent panels and radiating outwardly from said apex, auxiliary members connecting the peripheral end of each of said airfoil panels with the adjacent airfoil panel, rigging lines attached to each of said auxiliary members at an off-center point between each of said panels whereby upon deployment of the parachute warpage of the canopy will produce angular rotation thereof.

3. A parachute comprising a canopy composed of a plurality of airfoil panels, said panels terminating at the apex of said canopy, each of said panels successively overlapping the adjacent panels and radiating outwardly from said apex, auxiliary members connecting the peripheral end of each of said airfoil panels with the adjacent airfoil panel, rigging lines movably attached to each of said auxiliary members at an off-center point between each of said panels whereby upon deployment of the parachute warpage of the canopy will produce angular rotation thereof.

4. A parachute comprising a canopy composed of a plurality of airfoil panels arranged symmetrically over the canopy area, said panels terminating at the apex of said canopy, each of said panels successively overlapping the adjacent panels and radiating outwardly from said apex, auxiliary members connecting the peripheral end of each of said airfoil panels with the adjacent airfoil panel, rigging lines attached to each of said auxiliary members at an off-center point between each of said panels whereby upon deployment of the parachute warpage of the canopy will produce angular rotation thereof.

5. A parachute comprising a canopy composed of a plurality of airfoil panels arranged symmetrically over the canopy area, said panels terminating at the apex of said canopy, each of said panels successively overlapping the adjacent panels and radiating outwardly from said apex, a jet vent positioned in said canopy area, auxiliary members connecting the peripheral end of each of said airfoil panels with the adjacent airfoil panel, rigging lines movably attached to each of said auxiliary members at an off-center point between each of said panels whereby upon deployment of the parachute warpage of the canopy will produce angular rotation thereof.

6. A parachute comprising a canopy, a plurality of airfoil panels terminating at the apex of said canopy and radiating outwardly therefrom, certain of said airfoil panels overlapping spaced adjacent airfoil panels and separated by slot vents therebetween, adjustable rigging means attached to the periphery of said canopy whereby upon deployment of said parachute warpage of the airfoil panels forming said canopy will produce angular rotation.

7. A parachute comprising a canopy, a plurality of airfoil panels terminating at the apex of said canopy and radiating outwardly therefrom, certain airfoil panels overlapping spaced adjacent airfoil panels and separated by slot vents therebetween, auxiliary control means positioned in the peripheral portion of said slot vents, adjustable rigging means attached to the periphery of said canopy and said auxiliary control means, whereby upon deployment of the parachute warpage of the canopy will produce angular rotation thereof.

8. A parachute comprising a canopy, a plurality of airfoil panels terminating at the apex of said canopy and radiating outwardly therefrom, certain airfoil panels overlapping spaced adjacent airfoil panels and separated by slot vents therebetween, a jet vent centrally located in said canopy to equalize the spilled air during descent, auxiliary control means positioned in the peripheral portion of said slot vents, adjustable rigging means attached to the periphery of said canopy and said auxiliary control means whereupon deployment of the parachute warpage of the canopy will produce angular rotation thereof.

9. A parachute comprising a canopy composed of a plurality of radially extending airfoil panels terminating at the crown area of the canopy, each of said airfoil panels having leading and trailing edges, each airfoil panel displaced from the adjacent airfoil panel to form a slot vent therebetween, the peripheral edges of said airfoil panels interconnected by auxiliary members, rigging lines interconnecting said auxiliary members and a load, adjustable control means interconnecting said auxiliary members and said rigging lines to radially displace the leading edge of one airfoil panel with the respective trailing edge of an adjacent airfoil panel whereby upon deployment of the parachute warpage of the airfoil panels will produce angular rotation of said canopy.

10. A parachute comprising a canopy composed of a plurality of airfoil panels terminating at the apex of said canopy and radiating outwardly therefrom, said certain panels displaced from an adjacent airfoil panel to form a slot vent therebetween, each of said airfoil panels having leading, trailing and peripheral edges, the peripheral edges of said certain airfoil panels interconnected by auxiliary members to adjacent members, rigging lines interconnecting said auxiliary members and a load, adjustable control means interconnecting said auxiliary members and said rigging lines to radially displace the leading edge of one airfoil panel with the respective trailing edge of an adjacent airfoil panel whereby upon deployment of the parachute warpage of the airfoil panels will produce angular rotation of said canopy.

11. A parachute comprising a canopy, a plurality of airfoil panels forming said canopy, certain of said airfoil panels terminating at the apex of said canopy and radiating outwardly therefrom, certain of said airfoil panels having leading, trailing and peripheral edges, said certain airfoil panels displaced from an adjacent airfoil panel to form a singular slot vent from the apex of said canopy to the peripheral edge, the peripheral edges of said certain airfoil panels interconnected by auxiliary members to adjacent members, rigging lines interconnecting said auxiliary members and a load, adjustable control means interconnecting said auxiliary members and said rigging lines to radially displace the leading edge of one airfoil panel with respect to the trailing edge of an adjacent airfoil panel by moving the point of attachment of the rigging lines to an off-point position on the auxiliary member whereby upon deployment of the parachute warpage of the airfoil panels will produce angular rotation of said canopy.

References Cited in the file of this patent

UNITED STATES PATENTS

| 2,384,127 | Nailor | Sept. 4, 1945 |
| 2,384,416 | Derry | Sept. 4, 1945 |
| 2,469,573 | Quilter | May 10, 1949 |

FOREIGN PATENTS

| 756,803 | France | Sept. 25, 1933 |
| 978,042 | France | Nov. 22, 1950 |